United States Patent [19]

Wolstein et al.

[11] 4,343,780

[45] Aug. 10, 1982

[54] PROCESS FOR THE SEPARATION OF SOLIDS FROM PHOSPHORIC ACID

[75] Inventors: Friedrich Wolstein, Essen; Egbert Hoffmann, Bochum; Wolfgang Epper, Bergheim-Kenten, all of Fed. Rep. of Germany

[73] Assignee: UHDE GmbH, Dortmund, Fed. Rep. of Germany

[21] Appl. No.: 228,895

[22] Filed: Jan. 27, 1981

[30] Foreign Application Priority Data

Jan. 30, 1980 [DE] Fed. Rep. of Germany ....... 3003250

[51] Int. Cl.³ .............................................. C01B 25/16
[52] U.S. Cl. ................................ 423/321 R; 210/781; 210/787
[58] Field of Search ................ 423/321 R, 320, 321 S; 210/781, 787, 906

[56] References Cited

U.S. PATENT DOCUMENTS 2,936,888  5/1960  Williams ......................... 423/321 R
3,206,282  9/1965  Crawford et al. .............. 423/321 R
3,528,771  9/1970  Shearin et al. ...................... 423/321
4,048,289  9/1977  Pierres ............................ 423/321 R

OTHER PUBLICATIONS

"Slack: Phosphoric Acids," 1968, pp. 689–692.
"Rompp: Chemie-Lexikon," 1966, p. 6878.

Primary Examiner—O. R. Vertiz
Assistant Examiner—Gregory A. Heller
Attorney, Agent, or Firm—Wilson, Fraser, Barker & Clemens

[57] ABSTRACT

A process is disclosed separating solids from phosphoric acid produced by the wet process. This is accomplished by relatively simple means but with a high degree of efficiency with reference to the $P_2O_5$ content of the phosphoric acid product.

3 Claims, 1 Drawing Figure

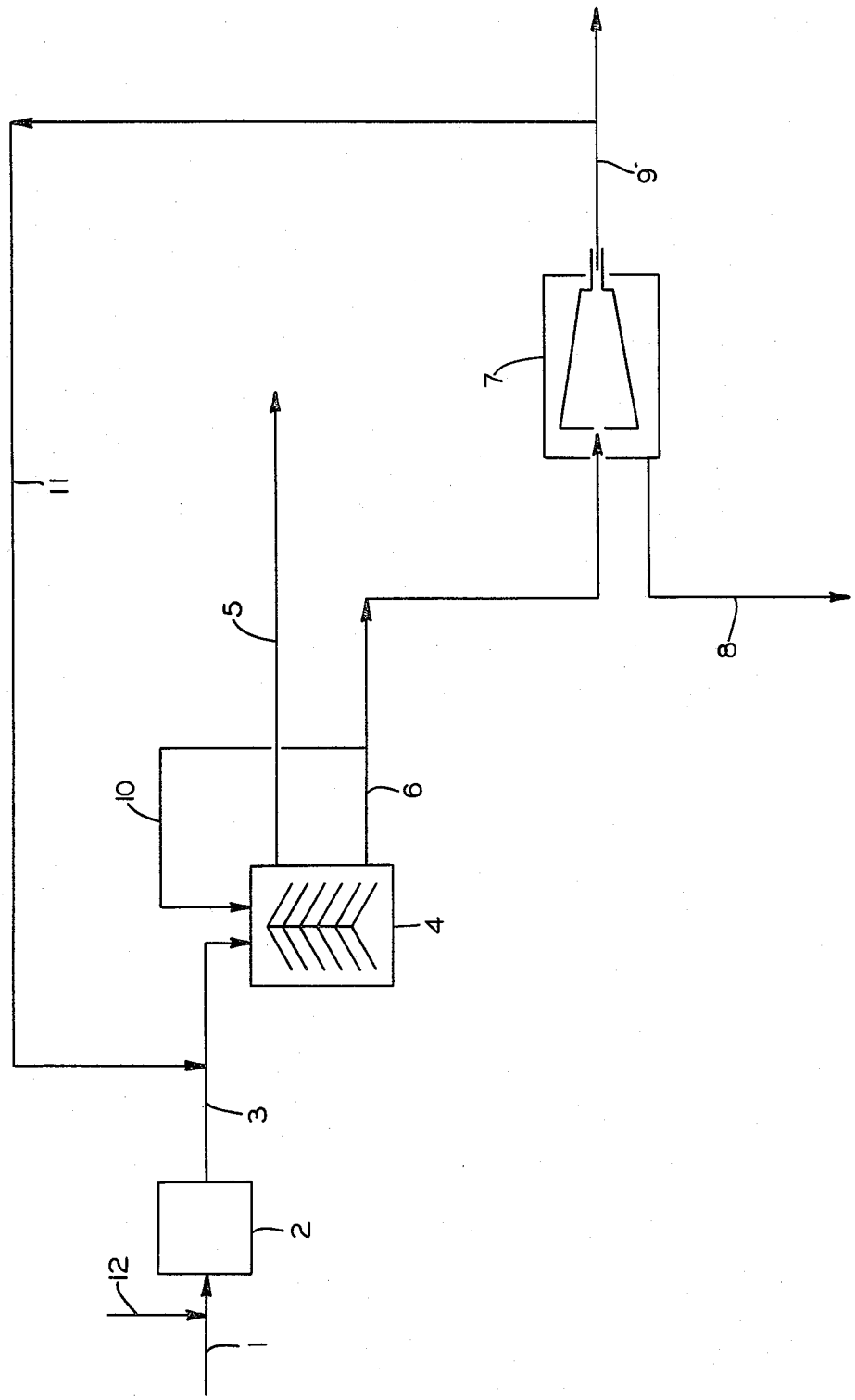

PROCESS FOR THE SEPARATION OF SOLIDS FROM PHOSPHORIC ACID

BACKGROUND OF THE INVENTION

The invention relates to a process for separating solids from phosphoric acid produced by the wet digestion process.

Several processes are known for purifying phosphoric acid produced by the wet process. In the case of phosphoric acid produced by the wet process, in which the phosphate rock is digested by sulphuric acid, very large quantities of dissolved or suspended impurities are contained in the sludge produced, e.g., $Al_2K(PO_4)_2OH.2H_2O$, $FeH_3(PO_4)_2.4H_2O$ or $Fe H (H_2PO_4)_4$. As these compounds are often in gel-like form, they are very difficult to separate.

DE-OS 24 36 921, for example, describes a process in which purification is achieved by the addition of calcium compounds, by precipitation of gypsum and by separating the sludge together with the gypsum.

Processes are also known in which flocculants are added to the acid (e.g., U.S. Pat. Nos. 3 644 091 and 3 907 680). Other purification processes are described in DE-OS Nos. 26 35 911 and 26 35 912, processes for removing organic compounds in DE-OS No. 25 22 220 or purification processes using organic solvents in DE-OS No. 24 35 789 or DE-OS No. 25 11 340.

The known processes either have a high energy or equipment demand or the throughput rates of dilute acid required for the separation process are so high as to render the process uneconomical.

SUMMARY OF THE INVENTION

The aim of the invention is to find a way to remove, by relatively simple means but with a high degree of efficiency referred to the $P_2O_5$ content, the gel-like sludge from phosphoric acid produced by the wet process.

BRIEF DESCRIPTION OF THE DRAWING

The accompanying drawing is a flow diagram illustrating one form of the present process.

DESCRIPTION OF THE PREFERRED EMBODIMENTS

Using a process of the type described at the beginning, the aim is achieved in that the solids concentration in the phosphoric acid is first increased to approximately 7% by concentrating to 54% $P_2O_5$ and this acid is then fed to a separator, where the thickened effluent has a solids concentration of approximately 15%, while the filtrate has a solids concentration of less than 0.5%. Then the thickened effluent from the separator is fed to a bowl centrifuge, the withdrawn slurry having a solids concentration of about 50–60% and the centrifuge effluent a solids concentration of about 1 to 6%. The solids concentration of the phosphoric acid at the start of the process may be in the range of 0.5–10%.

The concentration of phosphoric acid to 54% $P_2O_5$ by evaporation is known. It has been shown that the solids separated by the inventive process, i.e., the amount of solids in the slurry, referred to the feed acid, may amount to up to 30%. It is particularly important that, with the invention, it is also possible to separate solids from an acid with a relatively high viscosity.

An embodiment of the invention provides for part of the separator effluent to be returned to the separator, which results in an increased efficiency of this process section, depending on the setting of the system.

A further embodiment of the invention, according to which a part of the centrifuge filtrate is returned to the feed acid, also serves to achieve this aim.

Another essential feature of the invention is that the $SiO_2$ is added to the acid upstream of the separator, provision being made in a special embodiment of the invention for the amount of this $SiO_2$ to be approximately 0.1 to 0.7%, referred to acid with a $P_2O_5$ concentration of 54%.

Whereas chemically pure phosphoric acid has a viscosity of about $20 \times 10^{-3} Ns/m^2$, the viscosity according to the invention is increased by the addition of $SiO_2$ to maximum $200 \times 10^{-3} Ns/m^2$.

The viscosity of phosphoric acid depends, on the one hand, on the dissolved substances and on the solids content on the other hand. The solids concentration downstream of the separator should be approximately 15% according to the invention, and therefore this factor can be disregarded here. Increasing the viscosity by the addition of $SiO_2$ means that iron or aluminum compounds are no longer or only partly, precipitated, depending on the amount of $SiO_2$ added. Calcium compounds such as $CaSO_4.2H_2O$, $CaF_2$, $CaSiF_6$ and alkaline fluorides which are formed in quantities depending on the phosphoric acid concentration are separated in the subsequent centrifuging step as shown by an analysis of the sludge obtained by the inventive process.

TABLE 1

| | |
|---|---|
| 22.82% | $Na_2SiF_6$ |
| 3.98% | $H_2SiF_6$ |
| 36.57% | $CaSO_4.2 H_2O$ |
| 17.01% | $FePO_4$ |
| 2.03% | $AlPO_4$ |
| 82.41% | |

The remaining 17.59% are mainly phosphoric acid which is combined by the phosphates in a complex manner, as the $P_2O_5$ content of the sludge (dry) is 24.4%. Only 9.18% $P_2O_5$ are combined by $FePO_4$ and $AlPO_4$.

The amount by which the viscosity is increased due to the addition of $SiO_2$ depends on the degree of polymerization of the $SiO_2$. It has been shown that, according to the inventive viscosity increase, the composition of the phosphoric acid after the solids had been separated was as follows:

TABLE 2

| | |
|---|---|
| $P_2O_5$ | 49.4% |
| $Fe_2O_3$ | 1.1% |
| $Al_2O_3$ | 0.97% |
| F | 1.2% |
| $SiO_2$ | 0.12% |

This table demonstrates that the required, very high portion of iron and aluminum compounds is still present in the acid, whereas without the addition of $SiO_2$ (0.03%), the $Fe_2O_3$ content and $Al_2O_3$ content is 0.5%.

Table 3 shows the results obtained when using the inventive process, as well as the temperature ranges pertaining to the invention.

The set-up for the experiment is described below on the basis of FIG. 1. Phosphoric acid with a $P_2O_5$ concentration of approximately 30% is fed via a line (1) to a concentrator (2), which raises the phosphoric acid concentration to approximately 54% by evaporation.

From the concentrator (2), the concentrate is transferred via a line (3) to a separator (4), the filtrate of which is withdrawn via a line (5), the solids portion in the filtrate being less than 0.5%.

TABLE 3

| Solids in Feed Acid | Solids in Centrifuged Effluent | Solids as % of Slurry | Solids Separated (%) | P₂O₅ Yield | Differential Speed | Weir Setting | Temperature of Acid °C. | Calculated Throughput m³/h | Remarks |
| --- | --- | --- | --- | --- | --- | --- | --- | --- | --- |
| 14.2 | 1.95 | 58.4 | 89.23 | 89.48 | 19.37 | high | 48 | 0.106 | |
| 14.2 | 2.12 | 53.5 | 88.58 | 87.26 | 12.94 | high | 43 | 0.128 | |
| 14.2 | 2.69 | 54.6 | 85.03 | 88.47 | 12.94 | low | 47 | 0.134 | |
| 14.2 | 5.76 | 58.4 | 65.92 | 92.22 | 19.37 | low | 51 | 0.122 | |
| 9.95 | 2.46 | 45.9 | 79.50 | 89.64 | 19.37 | low | 17 | 0.105 | |
| 9.95 | 2.67 | 49.9 | 77.21 | 91.43 | 12.94 | low | 17 | 0.105 | |
| 14.2 | 4,38 | 58.5 | 74.72 | 91.20 | 12.94 | low | 65 | 0.140 | |
| 14.2 | 5.21 | 60.7 | 69.23 | 92.57 | 12.94 | low | 83 | 0.135 | |
| 4.23 | 1.73 | 59.6 | 60.76 | 98.19 | 12.94 | low | 12 | 0.119 | |
| 18.9 | 3.41 | 48.5 | 88.15 | 78.18 | 23.21 | low | 16 | 0.110 | |
| 18.9 | 1.86 | 51.5 | 93.55 | 79.48 | 23.21 | low | 19 | 0.070 | With Praestol additive 100 gr/m³ |

The thickened effluent is withdrawn from the separator via a line (6) and has a solids concentration of approximately 15%. This effluent is fed to a centrifuge (7), which may be of the bowl type according to the invention. The slurry, which is withdrawn via a line (8), has a solids content of approximately 60%, whereas the concentrate is withdrawn via a line (9) and has a solids content of approximately 2%. The recycle of part of the effluent from the separator is designated "10" and the recycle of the concentrate leaving the bowl centrifuge is designated "11".

The addition of SiO₂ at the beginning of the process, where, in the example illustrated, the acid has a P₂O₅ concentration of 30%, is designated "12".

It goes without saying that the invention can be modified in various ways without abandoning the basic idea of the invention. The invention is therefore not restricted to the devices mentioned as features for the implementation of the process, such as the separator and the bowl centrifuge. In the same way, other devices with a similar effect may also be used here.

We claim:

1. A process for separating solids from phosphoric acid produced by the wet digestion process which includes the steps of concentrating the phosphoric acid to about 54% thereby increasing the solids concentration in the acid to approximately 7% feeding the concentrated acid of increased solids content to a separator, where it is separated into a thickened effluent which has a solids concentration of approximately 15%, and a filtrate which has a solids concentration of less than 0.5, and feeding the thickened effluent from the separator to a bowl centrifuge which is operated to produce a withdrawn slurry having a solids concentration of about 50–60%, and a centrifuged effluent having a solids concentration of about 1 to 6%.

2. The process according to claim 1, wherein part of the separator effluent is recycled.

3. The process according to claim 1 or 2, wherein part of the effluent from the bowl centrifuge is returned to the feed acid.

* * * * *